(12) United States Patent
Sela et al.

(10) Patent No.: US 10,459,803 B2
(45) Date of Patent: Oct. 29, 2019

(54) METHOD FOR MANAGEMENT TABLES RECOVERY

(71) Applicant: Western Digital Technologies, Inc., San Jose, CA (US)

(72) Inventors: Rotem Sela, Hod Hasharon (IL); Amir Shaharabany, Kochav Yair (IL); Miki Sapir, Nes Ziona (IL); Eliad Adi Klein, Sunnyvale, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 175 days.

(21) Appl. No.: 15/685,555

(22) Filed: Aug. 24, 2017

(65) Prior Publication Data

US 2019/0004907 A1 Jan. 3, 2019

Related U.S. Application Data

(60) Provisional application No. 62/525,887, filed on Jun. 28, 2017.

(51) Int. Cl.
*G06F 11/14* (2006.01)
*G06F 9/4401* (2018.01)
*G06F 11/07* (2006.01)

(52) U.S. Cl.
CPC ........ *G06F 11/1469* (2013.01); *G06F 9/4406* (2013.01); *G06F 11/073* (2013.01); *G06F 11/0793* (2013.01); *G06F 11/1451* (2013.01); *G06F 9/4401* (2013.01); *G06F 11/1417* (2013.01); *G06F 2201/805* (2013.01); *G06F 2201/82* (2013.01)

(58) Field of Classification Search
CPC ...... G06F 11/14; G06F 11/1469; G06F 11/07; G06F 11/0793
USPC .......................................................... 714/19
See application file for complete search history.

(56) References Cited

U.S. PATENT DOCUMENTS

| 6,983,409 B1* | 1/2006 | Vollmer ................ H04L 1/1635 455/503 |
| 8,006,125 B1* | 8/2011 | Meng .................. G06F 11/1417 714/6.2 |
| 2005/0160342 A1* | 7/2005 | Wellig ............. H03M 13/2707 714/755 |
| 2006/0253645 A1* | 11/2006 | Lasser ................. G06F 11/1441 711/103 |
| 2007/0168698 A1* | 7/2007 | Coulson ............. G06F 12/0246 714/5.11 |

(Continued)

*Primary Examiner* — Kamini B Patel
(74) *Attorney, Agent, or Firm* — Patterson & Sheridan, LLP; Steven H. Versteeg (57) ABSTRACT

A controller receives an indication that a memory management table loaded to a random-access storage device is in a corrupted state. The controller retrieves one or more error recovery parameters of a memory unit stored in metadata of a physical block of a plurality of physical blocks of the non-volatile storage device. The controller examines the one or more error recovery parameters to determine whether the one or more error recovery parameters indicate the memory unit is fresh or stale. The controller updates the memory management table with logical-to-physical translation information of the metadata for the memory unit that is determined to be fresh. The controller writes the updated memory management table to the non-volatile storage device.

22 Claims, 9 Drawing Sheets

(56) References Cited

U.S. PATENT DOCUMENTS

| | | | | |
|---|---|---|---|---|
| 2007/0234112 A1* | 10/2007 | Thayer | ................... | G11C 29/76 |
| | | | | 714/6.13 |
| 2007/0300008 A1* | 12/2007 | Rogers | ................ | G06F 12/0292 |
| | | | | 711/103 |
| 2008/0177935 A1* | 7/2008 | Lasser | ................ | G06F 12/0246 |
| | | | | 711/103 |
| 2009/0055578 A1* | 2/2009 | Lee | .................... | G06F 12/0246 |
| | | | | 711/103 |
| 2010/0070729 A1* | 3/2010 | Ng | ....................... | G06F 3/0617 |
| | | | | 711/166 |
| 2010/0138622 A1* | 6/2010 | Furuya | ............... | G06F 11/1435 |
| | | | | 711/162 |
| 2010/0318845 A1* | 12/2010 | Kohiga | ................. | G06F 11/073 |
| | | | | 714/15 |
| 2013/0159769 A1* | 6/2013 | Buban | ...................... | G06F 1/14 |
| | | | | 714/20 |
| 2015/0046665 A1* | 2/2015 | Higgins | ............... | G06F 3/0619 |
| | | | | 711/158 |

* cited by examiner

BLOCK METADATA - CONTAINS PEC, ETC ...

PAGE #1:
FIRST FMU: 4KB DATA, FMU METADATA
(SEQUENCE NUMBER, FMU#, ETC ... ), FMU ECC

PAGE #1:
SECOND FMU: 4KB DATA, FMU METADATA
(SEQUENCE NUMBER, FMU#, ETC ... ), FMU ECC

PAGE #1:
THIRD FMU: 4KB DATA, FMU METADATA
(SEQUENCE NUMBER, FMU#, ETC ... ), FMU ECC

PAGE #1:
FORTH FMU: 4KB DATA, FMU METADATA
(SEQUENCE NUMBER, FMU#, ETC ... ), FMU ECC

PAGE #2:
FIRST FMU: 4KB DATA, FMU METADATA
(SEQUENCE NUMBER, FMU#, ETC ... ), FMU ECC

PAGE #2:
SECOND FMU: 4KB DATA, FMU METADATA
(SEQUENCE NUMBER, FMU#, ETC ... ), FMU ECC

⋮

LAST PAGE CONTAIN ALL THE FMU NUMBERS
WHICH ARE PRESENT IN THE BLOCK AND IN
WHICH PHYSICAL ADDRESS THEY ARE STORED

FIG. 2B

LOGICAL-TO-PHYSICAL SEQUENCE NUMBER TABLE — 210

- SEQUENCE NUMBER OF FMU#0
- SEQUENCE NUMBER OF FMU#1
- SEQUENCE NUMBER OF FMU#2
- ⋮

METHOD FOR MANAGEMENT TABLES RECOVERY

CROSS-REFERENCE TO RELATED APPLICATIONS

This application claims priority to U.S. Provisional Patent Application No. 62/525,887, filed Jun. 28, 2017, which is incorporated herein by reference in its entirety.

TECHNICAL FIELD

The disclosure generally relates to storage devices, and more particularly, to methods for self-recovery of management tables for solid state storage devices.

BACKGROUND OF THE DISCLOSURE

Field of the Disclosure

Solid-state drives (SSDs) may be used in computers when relatively low latency is desired. For example, SSDs may exhibit lower latency, particularly for random reads and writes, than hard disk drives (HDDs). This may allow greater throughput for random reads from and random writes to a SSD compared to a HDD. Additionally, SSDs may utilize multiple, parallel data channels to read from and write to memory devices, which may result in high sequential read and write speeds.

SSDs may be used in computers to replace traditional magnetic-based HDDs. SSDs may utilize non-volatile memory (NVM) devices, such as NAND flash memory devices, which continue to store data without requiring persistent or periodic power supply. NAND flash memory devices may be written many times. However, to reuse a particular NAND flash page, the controller typically erases the particular NAND flash block (e.g., during garbage collection). Erasing NAND flash memory devices many times may cause the flash memory cells to lose their ability to store charge, which reduces or eliminates the ability to write new data to the flash memory cells.

To manage the number of erases, reads, and writes for NAND flash memory in an efficient manner, a corresponding controller of the NAND flash memory maintains a flash management table to store logical to physical address mapping (L2P) to identify a location of user data in the physical NAND flash memory. The controller may also perform garbage collection to compact blocks and to copy valid data to new blocks before erasing a block and preparing the block to be programmed again. The flash management table also keeps track of garbage collection operations.

If the flash management table becomes corrupted, then the NAND flash memory device does not operate properly. Read operations return the wrong data, causing a host system that employs the NAND flash memory device to be unusable or cause the host system to fail to boot. In such circumstances, the host system may attempt to reset the NAND flash memory device; however, if the flash management table is corrupted, the failure condition remains and the host system will not be able to boot.

Hence, there is a need to provide a method for managing flash management table recovery that is triggered under failure conditions but does not affect performance (or device behavior) of the NAND flash memory device during in normal operation.

SUMMARY OF THE DISCLOSURE

In one example, a method for self-recovery of memory management tables for solid state storage devices is disclosed. A controller of a storage device receives an indication that a memory management table loaded to a random-access memory device and associated with a non-volatile memory device is in a corrupted state. The controller retrieves one or more error recovery parameters of a memory unit stored in metadata of a physical block of a plurality of physical blocks of the non-volatile memory device. The controller examines the one or more error recovery parameters to determine whether the one or more error recovery parameters indicate the memory unit is fresh or stale. The controller updates the memory management table with logical-to-physical translation information of the metadata for the memory unit that is determined to be fresh. The controller writes the updated memory management table to the non-volatile memory device.

The details of one or more examples are set forth in the accompanying drawings and the description below. Other features, objects, and advantages will be apparent from the description and drawings, and from the claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In general, this disclosure describes techniques for the recovery of device data by rebuilding flash management tables involving a storage device, such as a SSD.

Figure 1:
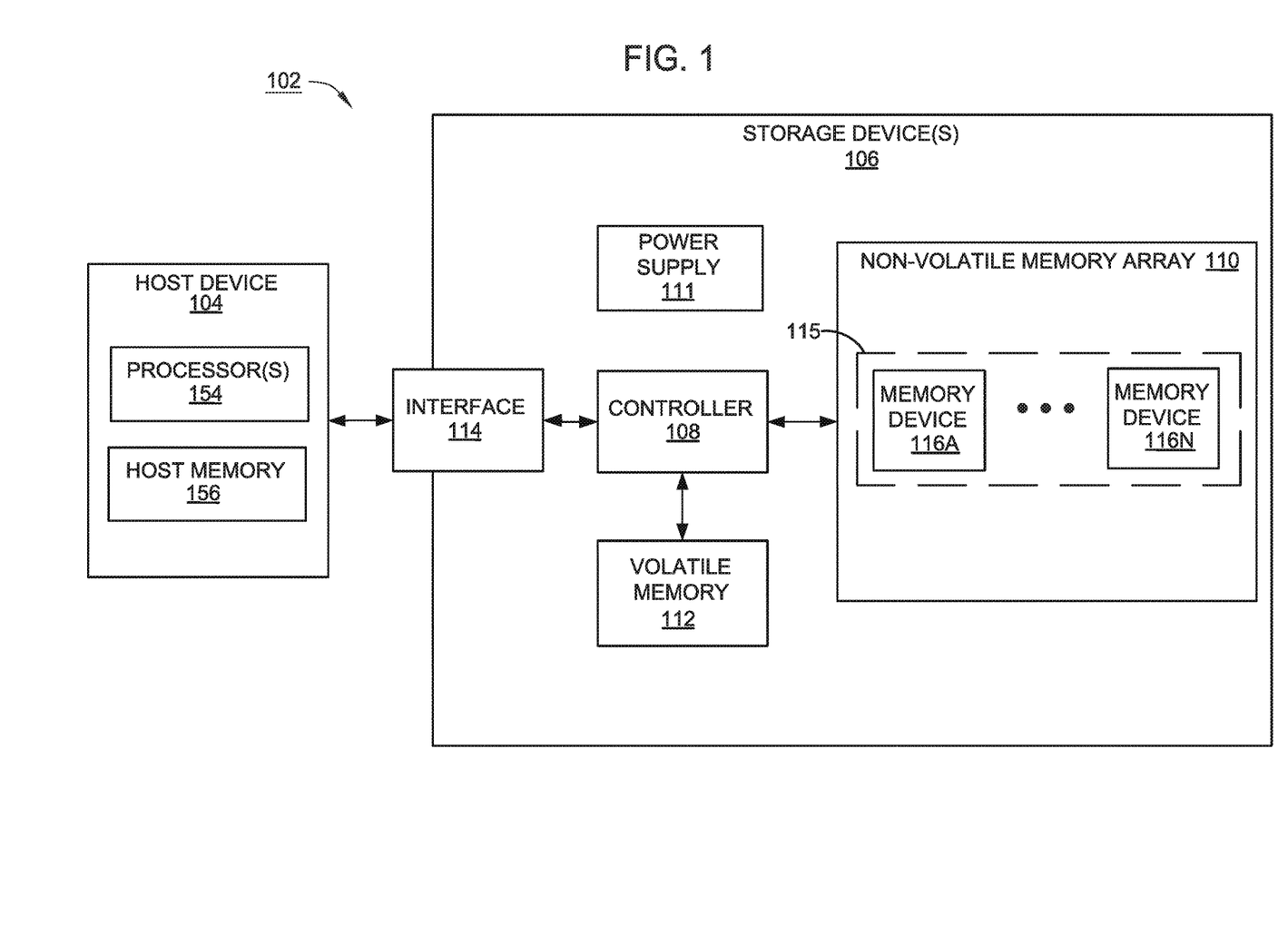
FIG. 1 is a conceptual and schematic block diagram illustrating an example storage environment in which a storage device may function as a storage device for a host device, in accordance with one or more techniques of this disclosure.

FIG. 1 is a conceptual and schematic block diagram illustrating an example storage environment 102 in which storage device 106 may function as a storage device for host device 104, in accordance with one or more techniques of this disclosure. For instance, host device 104 which may store data to and/or retrieve data from one or more storage devices 106. In some examples, storage environment 102 may include a plurality of storage devices, such as storage device 106, which may operate as a storage array.

Host device 104 may include any computing device, including, for example, a computer server, a network attached storage (NAS) unit, a desktop computer, a notebook (e.g., laptop) computer, a tablet computer, a set-top box, a mobile computing device such as a "smart" phone, a television, a camera, a display device, a digital media player, a video gaming console, a video streaming device, or the like. Host device 104 may include at least one processor 154 and host memory 156. At least one processor 154 may include any form of hardware capable of processing data and may include a general purpose processing unit (such as a central processing unit (CPU)), dedicated hardware (such as an application specific integrated circuit (ASIC)), configurable hardware (such as a field programmable gate array (FPGA)), or any other form of processing unit configured by way of software instructions, microcode, firmware, or the like. Host memory 156 may be used by host device 104 to store information (e.g., temporarily store information). In some examples, host memory 156 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

As illustrated in FIG. 1, storage device 106 includes controller 108, non-volatile memory array (NVMA) 110, power supply 111, volatile memory 112, and interface 114. In some examples, storage device 106 may include additional components not shown in FIG. 1 for sake of clarity. For example, storage device 106 may include a printed board (PB) to which components of storage device 106 are mechanically attached and which includes electrically conductive traces that electrically interconnect components of storage device 106, or the like. In some examples, the physical dimensions and connector configurations of storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI®), PCI-extended (PCI-X®), PCI Express (PCIe®) (e.g., PCIe® x1, x4, x8, x16, PCIe® Mini Card, MiniPCI®, etc.), M.2, or the like. In some examples, storage device 106 may be directly coupled (e.g., directly soldered) to a motherboard of host device 104.

Storage device 106 includes interface 114 for interfacing with host device 104. Interface 114 may include one or both of a data bus for exchanging data with host device 104 and a control bus for exchanging commands with host device 104. Interface 114 may operate in accordance with any suitable protocol. For example, interface 114 may operate according to a serially attached SCSI (SAS)/e.MMC/UFS/NVMe protocol.

However, in other examples, the techniques of this disclosure may apply to an interface 114 that operates in accordance with one or more of the following protocols: advanced technology attachment (ATA) (e.g., serial-ATA (SATA), and parallel-ATA (PATA)), Fibre Channel, small computer system interface (SCSI), Non-Volatile Memory Express (NVMe™), PCI®, PCIe®, or the like. The interface 114 (e.g., the data bus, the control bus, or both) is electrically connected to controller 108, providing a communication channel between host device 104 and controller 108, allowing data to be exchanged between host device 104 and controller 108. In some examples, the electrical connection of interface 114 may also permit storage device 106 to receive power from host device 104.

Storage device 106 may include power supply 111, which may provide power to one or more components of storage device 106. When operating in a standard mode, power supply 111 may provide power to the one or more components using power provided by an external device, such as host device 104. For instance, power supply 111 may provide power to the one or more components using power received from host device 104 via interface 114. In some examples, power supply 111 may include one or more power storage components configured to provide power to the one or more components when operating in a shutdown mode, such as where power ceases to be received from the external device. In this way, power supply 111 may function as an onboard backup power source. Some examples of the one or more power storage components include, but are not limited to, capacitors, super capacitors, batteries, and the like.

Storage device 106 also includes volatile memory 112, which may be used by controller 108 to store information. In some examples, controller 108 may use volatile memory 112 as a cache. For instance, controller 108 may store cached information in volatile memory 112 until the cached information is written to non-volatile memory array 110. Volatile memory 112 may consume power received from power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

Storage device 106 also includes non-volatile memory array (NVMA) 110. For example, NVMA 110 includes NVM 115 may include a plurality of memory devices. For example, as illustrated in FIG. 1, NVM 115 may include memory devices 116A-116N (collectively, "memory devices 116"). Each of memory devices 116 may be configured to store and/or retrieve data. For instance, controller 108 may store data in memory devices 116 and may read data from memory devices 116. In some examples, memory devices 116 may be referred to as a die. In some examples, memory device 116 may include more than one die. In some examples, a single physical chip may include a plurality of dies (i.e., a plurality of memory devices 116). In some examples, memory devices 116 may be configured to store relatively large amounts of data (e.g., 128 MB, 512 MB, 1 GB, 4 GB, 16 GB, 64 GB, 128 GB, 512 GB, 1 TB, etc.).

Memory devices 116 may include any type of NVM devices, such as flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices. Unlike flash memory devices, PCM devices, ReRAM devices, MRAM devices, and F-RAM devices may not require stale block reclamation (e.g., garbage collection), but still may utilize wear leveling to reduce effects of limited write endurance of individual memory cells. In some examples, PCM, ReRAM, MRAM, and F-RAM devices may have better endurance than flash memory devices. In other words, PCM, ReRAM, MRAM, and F-RAM devices may be capable of performing more read and/or write operations before wearing out compared to flash memory devices.

In examples where memory devices 116 of NVM 115 include flash memory devices, each memory device of memory devices 116 may include a plurality of blocks, each block including a plurality of pages. Each block may include 128 KB of data, 256 KB of data, 2 MB of data, 8 MB of data, etc. In some instances, each page may include 1 kilobyte (KB) of data, 4 KB of data, 8 KB of data, etc. In some instances, each flash memory unit (FMU) may include 1 kilobyte (KB) of data, 4 KB of data, 8 KB of data, etc. Controller 108 may write data to and read data from memory devices 116 at the FMU level and erase data from memory devices 116 at the block level. In other words, memory devices 116 may be FMU addressable.

Storage device 106 includes controller 108, which may manage one or more operations of storage device 106. For instance, controller 108 may manage the reading of data from and/or the writing of data to NVMA 110. Controller 108 may represent one of or a combination of one or more of a microprocessor, digital signal processor (DSP), application specific integrated circuit (ASIC), field programmable gate array (FPGA), or other digital logic circuitry. In accordance with techniques of this disclosure, controller 108 may manage writes to, and reads from, different types of non-volatile memory devices within NVMA 110. In some examples, NVMA 110 includes a type of NVM 115 that includes a plurality of memory devices. For example, memory devices 116 of NVM 115 may include flash memory devices (e.g., NAND or NOR), which may, in some examples, have read latencies in the tens of microseconds (µs) and write latencies in the hundreds of µs. For instance, the read latency for memory devices 116 may be between approximately 20 µs and approximately 30 µs and the write latency for memory device 116 may be between approximately 100 µs and approximately 500 µs.

Figure 2A:
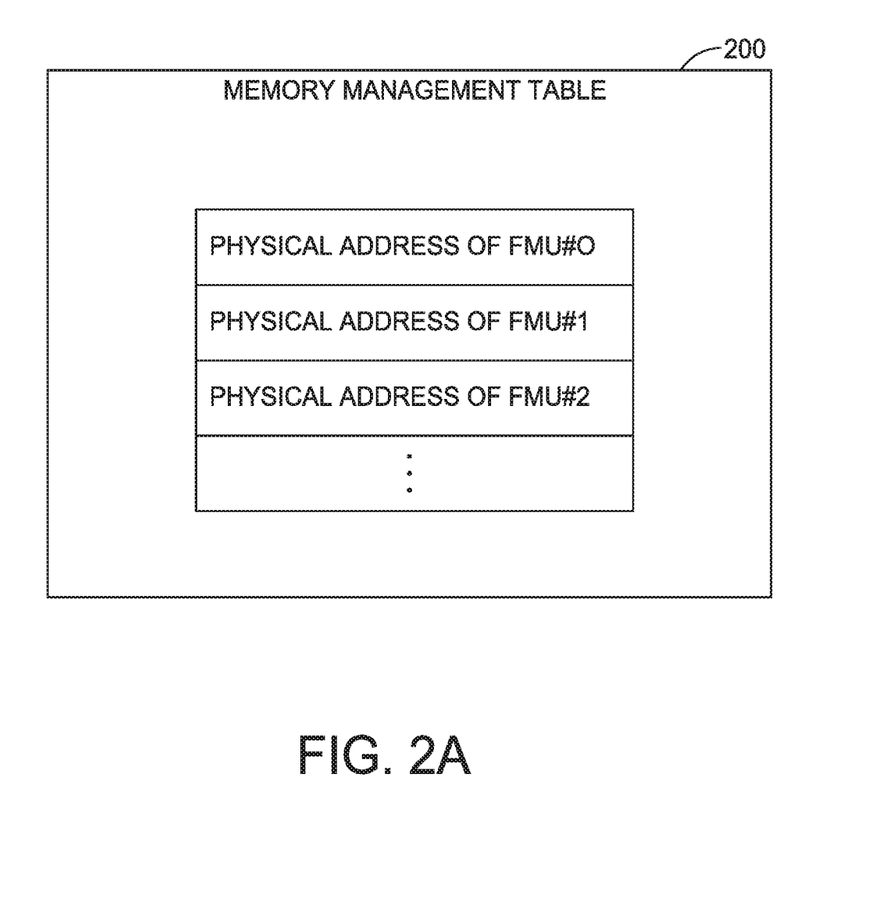
FIG. 2A is a conceptual block diagram illustrating an example memory management table.

Each memory device of memory devices 116 may include a plurality of blocks; each block including a plurality of pages; each page may contain zero or more flash management units (FMUs); and an FMU including a plurality of bytes. As used herein, an FMU refers to an addressable unit of memory of memory devices 116. FIG. 2A shows a memory management table 200 of logical-to-physical address translation information organized by FMUs. Each FMU has a unique identifier independent of the block number or the page number to which the FMU belongs. The unique identifier may be, as shown in FIG. 2A, an index into the memory management table 200 organized as an array of physical addresses. In some instances, each FMU may include 1 kilobyte (KB) of data, 4 KB of data, 8 KB of data, etc. In some examples (e.g., where memory devices 116 of NVM 115 include flash memory devices), controller 108 may write data to and read data from memory devices 116 at the FMU level and erase data from memory devices 116 at the block level. In other words, memory devices 116 may be FMU addressable.

Figure 2B:
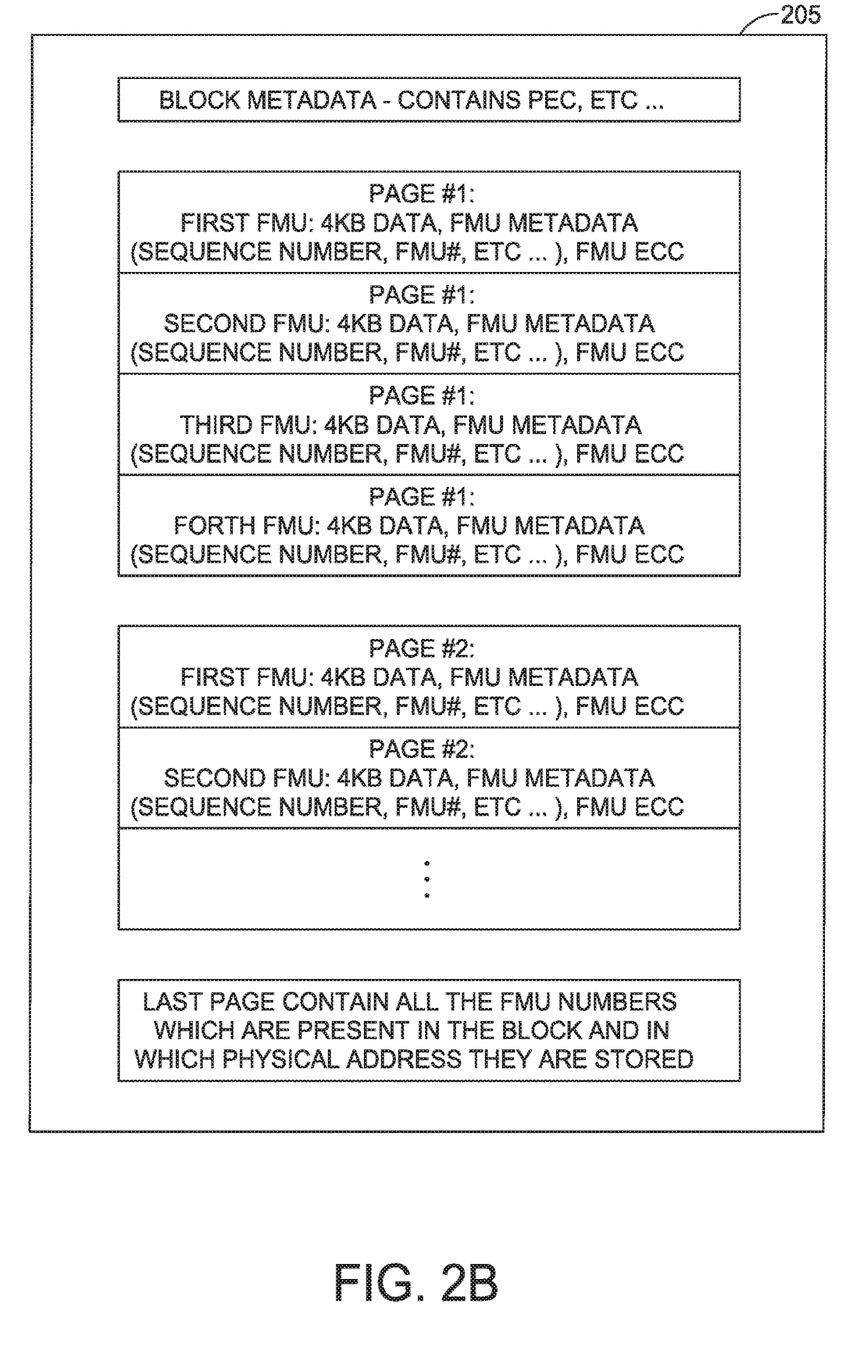
FIG. 2B shows an organization of a memory block to store a data payload with accompanying metadata.

In operation, controller 108 may receive a write request from host device 104 and may determine where to store a data payload included in the write request. The write request may include the data payload and a logical address. The controller 108 may store the data payload in memory devices 116. When storing the data payload in memory devices 116, the controller 108 creates metadata for the data payload and stores the metadata 402 and the data payload in the memory devices 116 in a manner that the controller 108 can later associate the data payload with a logical address mapped to a physical address. FIG. 2B shows an organization of a memory block 205 to store the data payload with accompanying metadata. Each memory block 205 includes metadata for the memory block 205 as a whole that includes a header containing at least a block number and a program erase count (PEC). The PEC count may be maintained by the memory devices 116 on a per block basis and increases every time a block is erased. In another embodiment, the PEC is written as metadata per block (to be recovered if needed) in a separate table (for wear level normal usage) from the memory block 205.

Each block is divided into FMUs containing data associated with an FMU (e.g., 4 Kbytes) and FMU metadata 402. The FMU metadata 402 includes at least an identifier (e.g., index number into the memory management table 200), an associated physical address of the FMU, and a sequence number of the associated FMU. The sequence number identifies a time stamp or a count of a when the FMU was written to the memory devices 116. For example, sequence #1 may be the first FMU written, sequence #2 may be the second FMU written, etc., in increasing order of time of write. For each FMU corresponding to a physical address, the metadata 402 may further include a corresponding error correction code (ECC). The very last page of the memory block 205 may store identifiers for each of the FMUs stored in the memory block 205 along with the corresponding physical address of each of the FMUs.

Figure 2C:
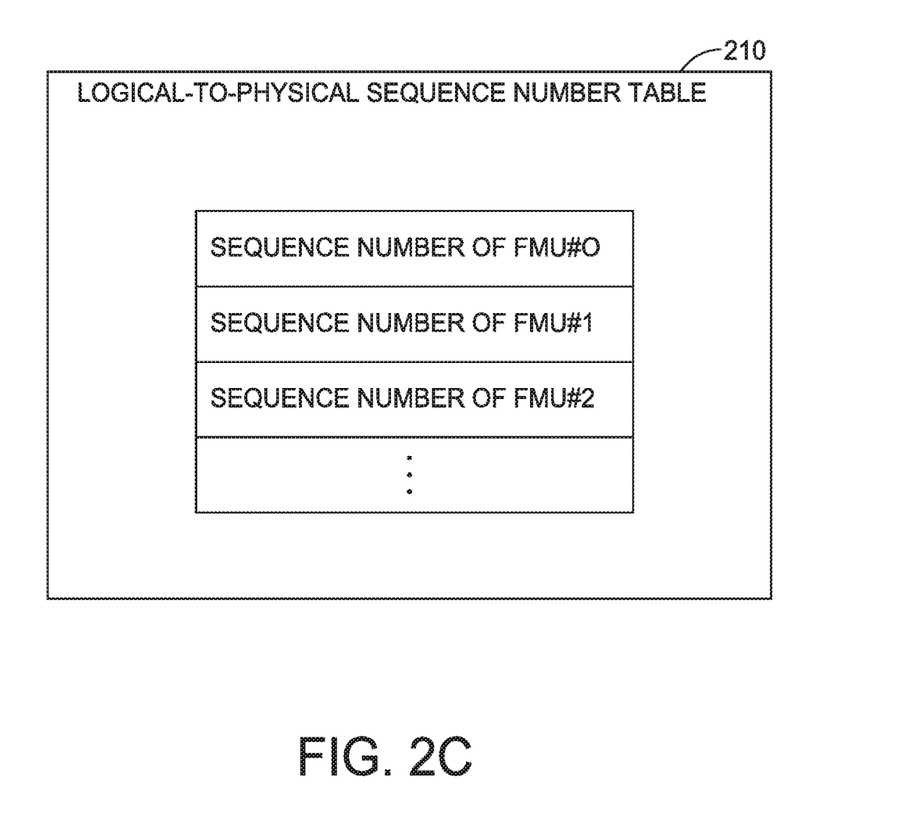
FIG. 2C shows a logical-to-physical sequence number table stored in volatile memory containing entries for a sequence number corresponding to an FMU.

Referring to FIG. 2C, during recovery of the memory management table 200, the controller 108 may make use of an auxiliary table, known as a logical-to-physical sequence number table 210 stored in volatile memory 112 containing entries for sequence numbers corresponding to FMUs.

In response to receiving data to be written, controller 108 may determine an NVM device (e.g., NVM 115) to store the data payload. In some examples, controller 108 may determine an NVM device to assign to the data payload. In some storage devices, re-writing a single FMU of data to FMU addressable memory devices 115 may involve writing the FMU to a new physical location, updating (e.g., by a flash-translation layer) a mapping between the logical address and the new physical location of the FMU, and marking the old FMU as stale, which may eventually require erasing an entire block (e.g., performing garbage collection) to re-use the old FMUs.

Figure 3:
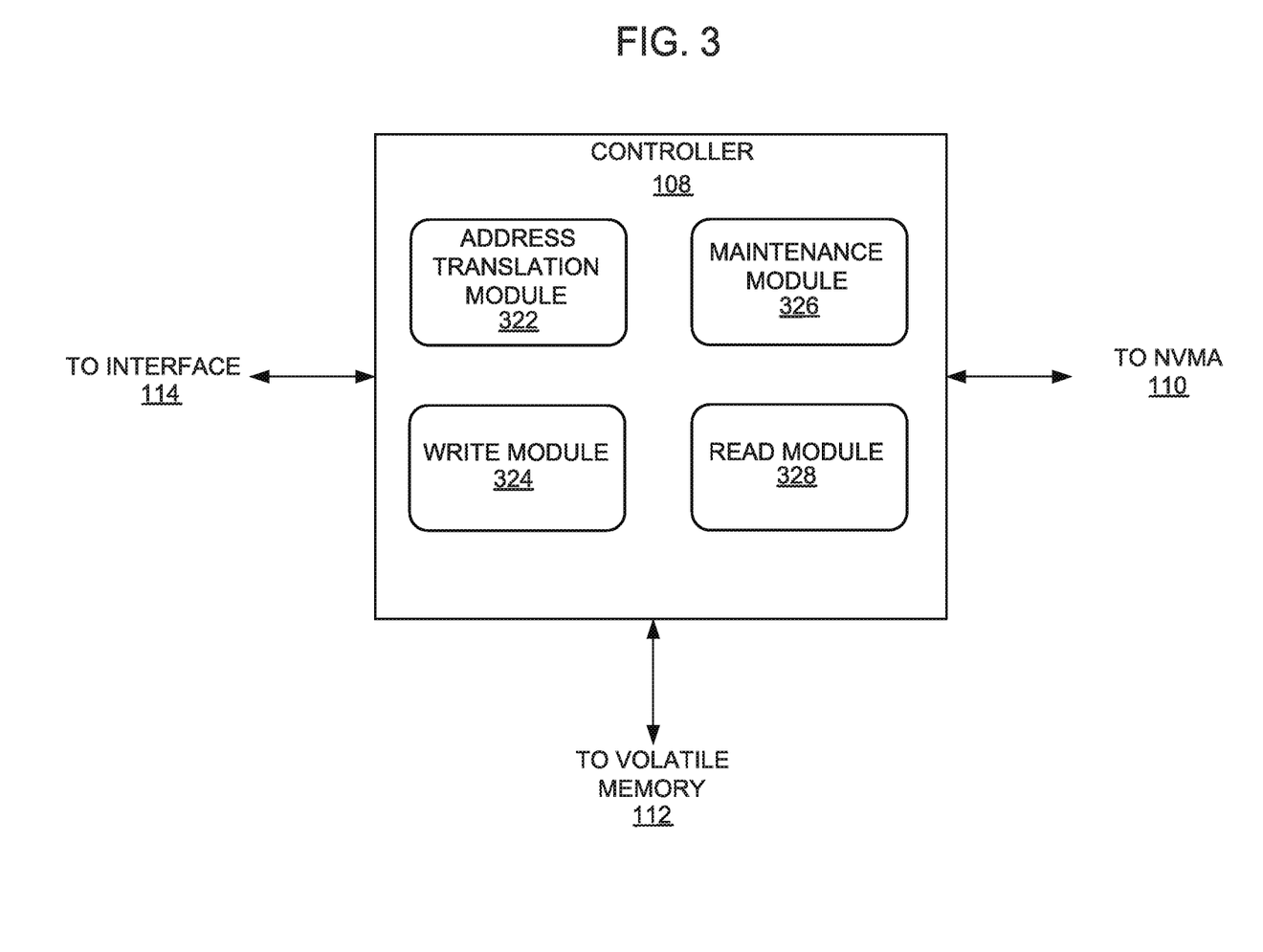
FIG. 3 is a conceptual and schematic block diagram illustrating an example controller, in accordance with one or more techniques of this disclosure.

FIG. 3 is a conceptual and schematic block diagram illustrating example details of controller 108. In some examples, controller 108 include one or more address translation modules 322, one or more write modules 324, one or more maintenance modules 326, and one or more read modules 328. In other examples, controller 108 may include additional modules or hardware units, or may include fewer modules or hardware units. Controller 108 may include various types of digital logic circuitry, such as any combination of one or more microprocessors, one or more digital signal processors (DSPs), one or more application specific integrated circuits (ASICs), one or more field programmable gate arrays (FPGAs), or other types of digital logic circuitry.

Controller 108 of storage device 106 (e.g., as shown in FIG. 1) may interface with the host device 104 of FIG. 1 via interface 114 and manage the storage of data to and the retrieval of data from memory devices 116 of NVMA 110 of FIG. 1. For example, one or more write modules 324 of controller 108 may manage writes to memory devices 116. For purposes of illustration only, controller 108 is described as including a single write module 324. For instance, write module 324 may receive a write request that includes a logical address (LBA) of the associated FMU of data to write, a sequence number of the FMU to be written, and an FMU number associated with the logical address. The write module 324 may manage writing of the data payload to an FMU of memory block 205 as shown in FIG. 2B. Write module 324 may communicate with one or more address translation modules 322, which manages translation between logical addresses (LBAs) used by host device 104 to manage storage locations of data and physical addresses used by write module 324 to direct writing of data to memory devices 116. In some examples, controller 108 may include an address translation module 322. For purposes of illustration only, controller 108 is described as including a single address translation module 322. Address translation module 322 of controller 108 may utilize an indirection table, also referred to as a mapping table or a memory management table 200 that translates FMU indices of data stored by memory devices 116 to physical addresses of data stored by memory devices 116. For example, host device 104 may utilize the logical block addresses of the data stored by memory devices 116 in instructions or messages to storage device 106, while write module 324 utilizes physical addresses of the data to control writing of data to memory devices 116. (Similarly, read module 328 may utilize physical addresses to control reading of data from memory devices 116.) The physical addresses correspond to actual, physical locations of memory devices 116. In some examples, address translation module 322 may store the memory management table 200 in volatile memory 112 and periodically store a copy of the memory management table 200 to memory devices 116.

In this way, host device 104 may use a static logical address for a certain set of data, while the physical address at which the data is actually stored may change. Address translation module 322 may maintain the indirection table to map logical addresses to physical addresses to allow use of the static logical addresses by the host device 104 while the physical addresses of the data may change, e.g., due to wear leveling, garbage collection, or the like.

As described in more detail with reference to FIG. 3, write module 324 of controller 108 may perform one or more operations to manage the writing of data to memory devices 116 in response to write requests. For example, write module 324 may manage the writing of data to memory devices 116 by selecting physical locations within memory devices 116 to store the data payload specified in the write request. As discussed above, write module 324 may interface with address translation module 322 to update the memory management table 200 based on the selected physical locations.

For instance, write module 324 may receive a message from host device 104 that includes a data payload, and a logical block address associated with an FMU corresponding to the data payload. Write module 324 may determine a physical location of memory devices 116 to store the data, and interface with the particular physical location of memory devices 116 to actually store the data. Write module 324 may then interface with address translation module 322 to update the memory management table 200 to indicate the FMU identifier and the corresponding physical location(s) of the associated FMU within the memory devices 116. Write module 324 may further interface with address translation module 322 to update the metadata 402 that associates the FMU identifier with the corresponding physical address in the memory block 205. Read module 328 similarly may control reading of data from memory devices 116 in response to a read request. In some examples, controller 108 may include one or more read modules 328 that may read data from different memory devices. For instance, a read module 328 may read data from memory devices 116. For purposes of illustration only, controller 108 is described as including a single read module 328. For example, read module 328 may receive a read request or other message from host device 104 requesting data with an associated logical address. Read module 328 may interface with address translation module 322 to convert the logical address to a physical address using the memory management table 200. Read module 328 may then retrieve the data from the physical addresses provided by address translation module 322. Maintenance module 326 may represent a module configured to perform operations related to maintaining performance and extending the useful life of storage device 106 (e.g., memory devices 116). For example, maintenance module 326 may implement at least one of wear leveling, garbage collection techniques, and management table recovery techniques.

Figure 4:
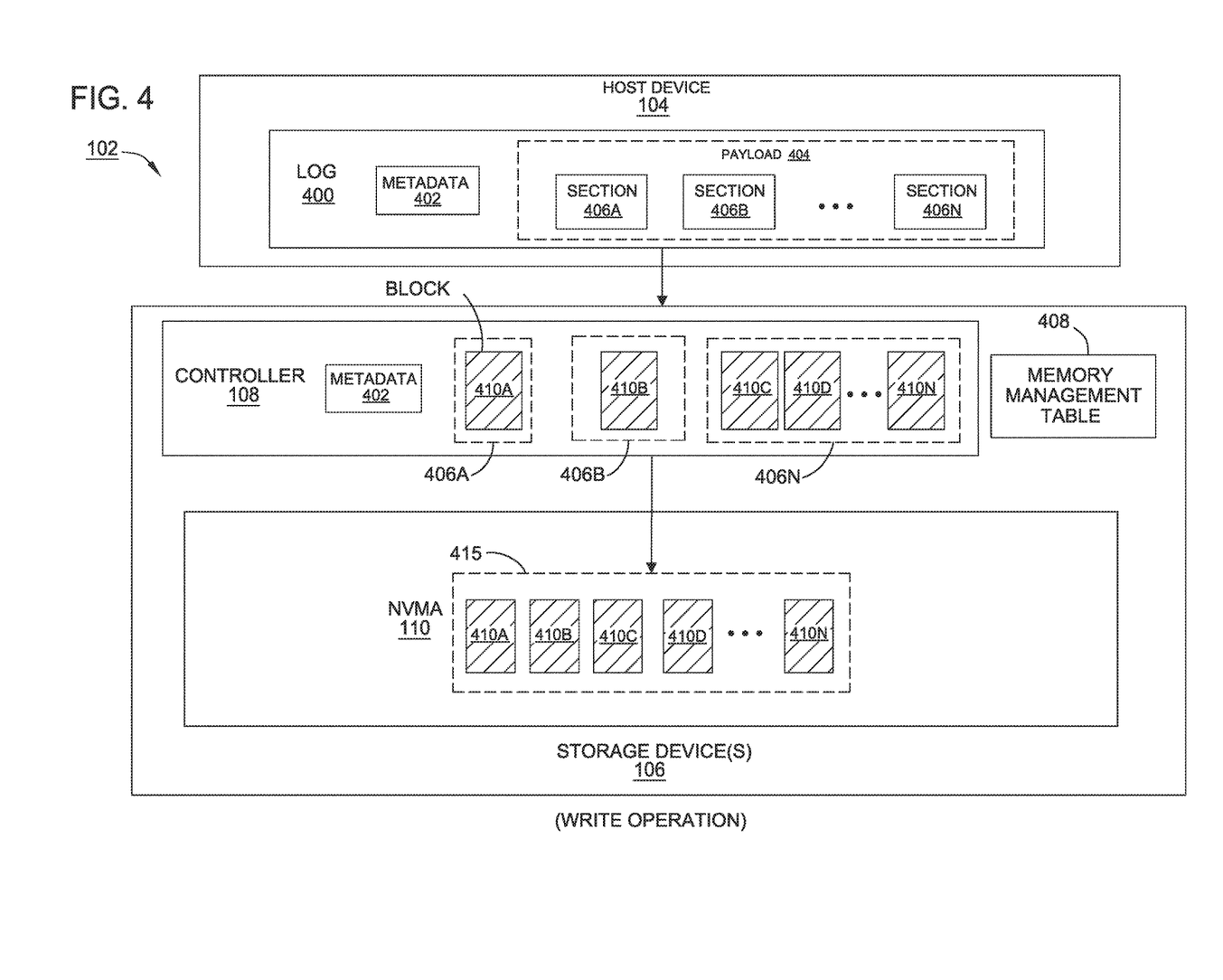
FIG. 4 is a conceptual and schematic block diagram illustrating an example storage environment in which a storage device may perform a write operation, in accordance with one or more techniques of this disclosure.

FIG. 4 is a conceptual diagram illustrating example storage environment 102 in which a storage device 106 may perform a write operation, in accordance with one or more techniques of this disclosure. FIG. 4 illustrates and describes conceptual and functional elements of FIGS. 1-2C, with concurrent reference to the physical components illustrated in FIGS. 1-2C.

Host device 104 may store data in host memory 156. When sending data from host memory 156 to storage device 106 as part of a write request, host device 104 may generate a data log 400. In some examples, host device 104 may generate a data log 400 by a block layer subsystem or by the file system. Data log 400 may include FMU metadata 402 and a data payload 404. FMU metadata 402 of each log entry may include a logical address associated with the respective payload 404, and an FMU number associated with the payload 404.

Storage device 106 of FIG. 1 may receive a write request that includes data log 400 and may store the data log 400 in volatile memory 112. As illustrated in FIG. 4, section 406A includes memory block 410A (of the payload 404 comprising sections 406A-406N). After storing data log 400 to volatile memory 112, write module 324 may determine an NVM device (e.g., NVM 115) to store the data received as part of data log 400. For example, write module 324 may store some of the data in log 300 to a type of NVM device (e.g., NMV 115).

Storage device 106 may include one or more memory management tables 200, 408 used to track the physical locations at which data is stored. For instance, address translation module 322 may manage memory management table 200, 408 to translate between logical addresses used by host device 104 and physical address used to actually store data blocks 310 at NVM 115. Address translation module 322 may manage memory management table 200 to store a logical addresses associated with the respective payload 306, and an FMU associated with the respective payload 306. Memory management table 200 may be stored in volatile memory 112 and may also be stored in persistent memory (e.g., NVM 115).

Maintenance module 326 of controller 108 may perform a recovery procedure of the memory management table 200, 408 after a system boot-up using the FMUs of memory of memory blocks 410A-410N to be discussed hereinbelow with reference to FIGS. 5-7. Maintenance module 326 is configured, during normal write operations, to store a physical address with the data and a sequence number for each FMU to be written in each block of NVMA 110 (comprising memory blocks 410A-410N) such that in case of failure the memory management table 200, 408 can be reconstructed by dedicated firmware. Maintenance module 326 is further configured to identify, either internally or by a command from the host device 104, that NVM 115 is in an error recovery state (ERS). Identification may occur either during device initialization or after device initialization. Once identified as being in the error recovery state, the maintenance module 326 begins a procedure to build memory management table 200, 408 using each FMU of each memory block (e.g., comprising memory blocks 410A-410N) of each block of NVMA 110. The procedure scans all the physical blocks of NVM 415 (or 115 in FIG. 1), extracts the physical address for each FMU from a respective memory block (e.g., 410A), identifies whether data stored in each of the FMUs is fresh or stale using FMU sequence numbers, updates the memory management table 200 in volatile memory 112 and writes the FMU to NVM 415. Optionally, the management module 326 signals to the host device 104 that the recovery procedure was completed successfully.

One method for initiating an ERS is for the host device 104 to invoke an ERS recovery command during a system boot. After controller 108 boots, controller 108 receives the ERS recovery command, which it then processes. Another method for initiating the ERS recovery procedure would occur when controller 108 attempts to boot, and controller 108 determines that NVM 115 is not booting. After a certain number of attempted reboots, maintenance module 326 of controller 108 determines that NVM 115 cannot re-boot, and then concludes that the NVM 115 has entered the ERS state, and initiates the recovery procedure.

For example, the ERS may be initiated because there are no reads from the boot partition. Booting parameters that could be manipulated when configuring NVM 115. One parameter may be, for example, how many times the device is booting without seeing the whole action.

Figure 5:
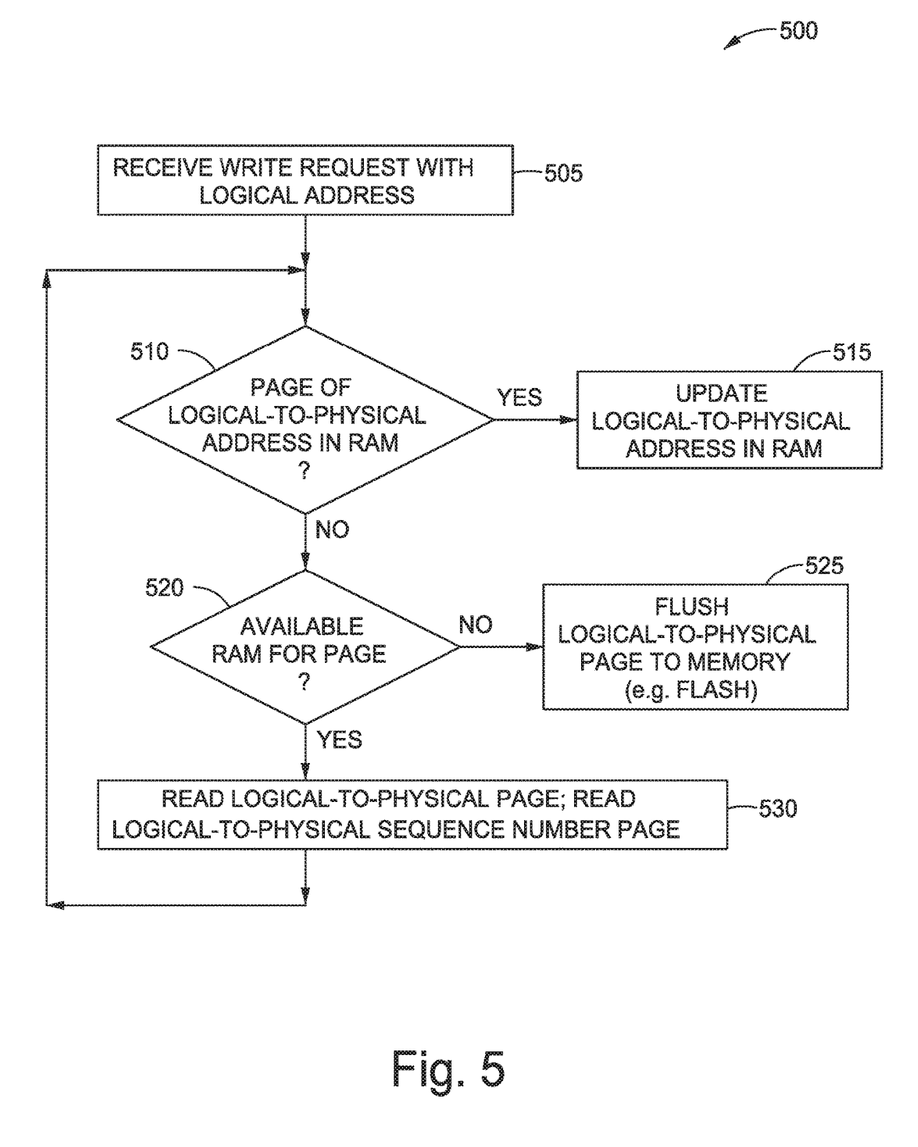
FIG. 5 is a flow diagram illustrating an example technique for enabling self-recovery of management tables for solid state storage devices, in accordance with one or more techniques of this disclosure.

FIG. 5 is a flow diagram 500 illustrating an example technique for enabling self-recovery of management tables for solid state storage devices, in accordance with one or more techniques of this disclosure. For ease of illustration, the technique of FIG. 5 will be described with concurrent reference to storage device 106 of FIGS. 1-2C. However, the techniques may be used with any combination of hardware or software.

At block 505, write module 324 of controller 108 of a host device 104 receives, from host device 104, a write request to update data associated with a particular logical address. In response to receiving the write request, address translation module 322 may update a memory management table 200 and a corresponding FMU of an associated memory block (e.g., 410A) with a corresponding physical address at which a particular data block is stored. Input parameters to the update may include the data to be stored, the logical address, a FMU identifier associated with the logical address, and a sequence number of the FMU corresponding to the logical address. Each FMU of the memory block (e.g., 410A) may have the corresponding logical address and the sequence number appended thereto. At block 510, write module 324 determines whether a page of memory management table 200 corresponding to the logical-to-physical translation of the input logical address is currently stored in volatile memory 112. If, at block 510, the page is currently stored in volatile memory 112, then at block 515, address translation module 322 updates the page found in volatile memory 112 with the corresponding logical address and sequence number of the logical in which the page is stored. The address translation module 322 further updates a corresponding FMU of the page of a particular data block addressed. If, at block 510, the page is not stored in volatile memory 112, then at block 520, address translation module 322 determines whether there is enough space available in volatile memory 112 to store the FMUs of memory management table 200 containing the logical-to-physical address mapping and sequence number(s) of FMUs. If, at block 520, address translation module 322 determines that there is not enough space available in volatile memory 112, then at block 525, address translation module 322 flushes the page to NVM 115. If, at block 520, address translation module 322 determines that there is enough space available in volatile memory 112 to store the page in volatile memory 112, then at block 530, address translation module 322 reads the logical-to-physical mapping of the page, FMU(s) and sequence number(s) from volatile memory before returning to execution at block 510.

Figure 6:
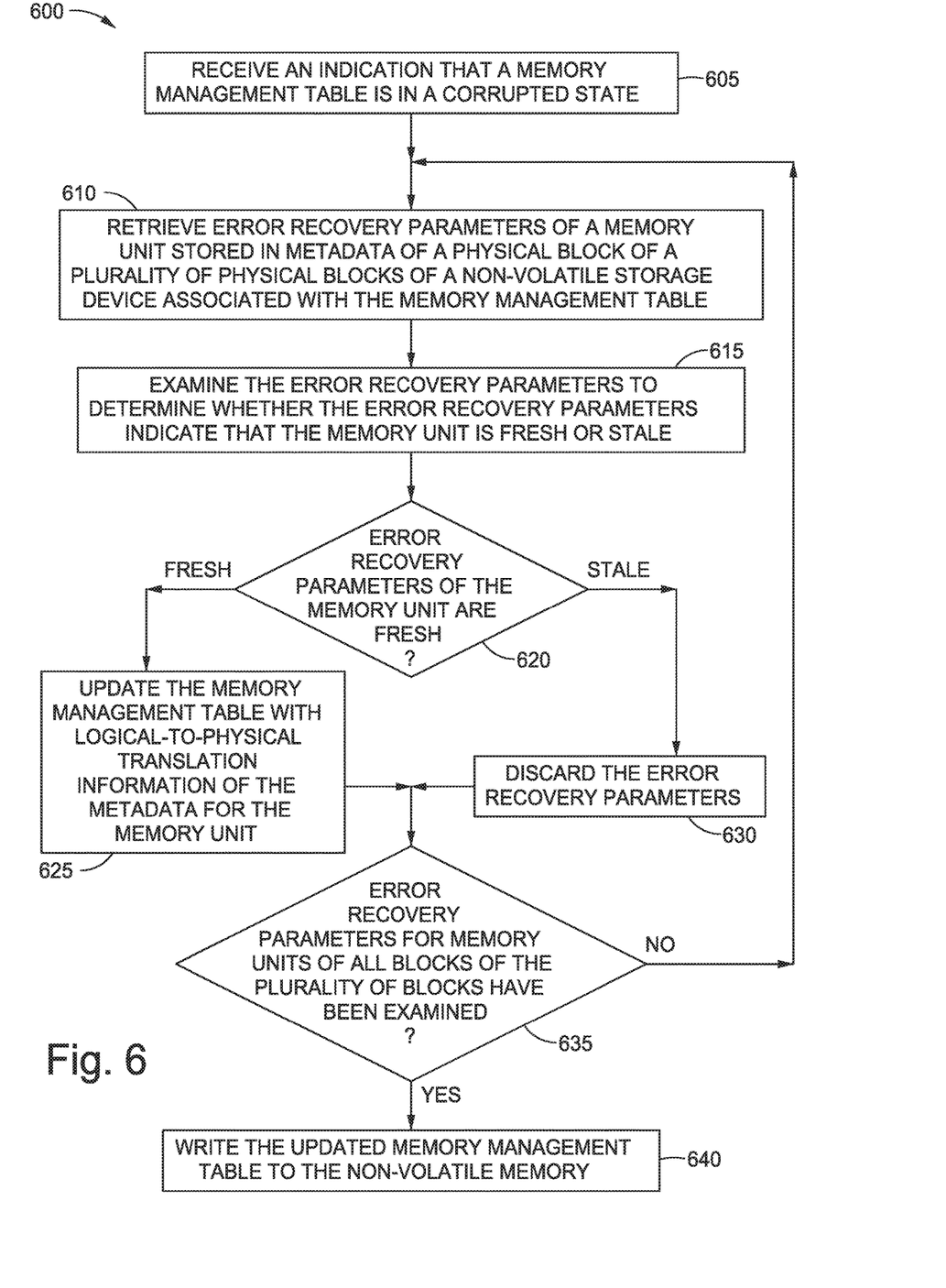
FIG. 6 is a flow diagram illustrating an example technique for self-recovery of management tables for solid state storage devices, in accordance with one or more techniques of this disclosure.

FIG. 6 is a flow diagram 600 illustrating an example technique for self-recovery of management tables for solid state storage devices, in accordance with one or more techniques of this disclosure. For ease of illustration, the technique of FIG. 6 will be described with concurrent reference to storage device 106 of FIGS. 1-2C. However, the techniques may be used with any combination of hardware or software.

At block 605, maintenance module 326 of controller 108 receives an indication that memory management table 200, 408 loaded to volatile memory 112 and associated with NVM 115 is in a corrupted state (e.g., an error recovery state). The maintenance module 326 receiving the indication that the memory management table 200, 408 is in a corrupted state may include the maintenance module 326 receiving a command for self-recovery of memory management tables 200, 408. The command may be received during system boot-up or after system boot-up. The maintenance module 326 receiving the indication that the memory management table is in a corrupted state may further include the maintenance module 326 determining that a threshold number of attempts to boot the controller 108 has failed.

At block 610, maintenance module 326 retrieves error recovery parameters of a memory unit stored in FMU metadata 402 of a physical block of a plurality of physical blocks of NVM 115. The error recovery parameters may include the logical address of the NVM 115 and/or a sequence number of the memory unit. The error recovery parameters may be loaded to volatile memory 112. At block 615, maintenance module 326 examines the error recovery parameters to determine whether the error recovery parameters indicate that the memory unit is fresh or stale. The memory unit may be a first memory unit. When the maintenance module 326 determines that the first memory unit and the second memory unit both have the same logical address and determines that a sequence number of the error recovery parameters corresponding to the first memory unit is greater than a sequence number corresponding to a second memory unit in the FMU metadata 402, the maintenance module 326 determines that the memory unit is fresh. When the maintenance module 326 determines that the sequence number of the error recovery parameters corresponding to the first memory unit is less than the sequence number corresponding to the second memory unit in the FMU metadata 402, the maintenance module 326 determines that the memory unit is stale.

At block 620, when maintenance module 326 determines that the memory unit is fresh, then at block 625, maintenance module 326 updates the memory management table 200, 408 with logical-to-physical translation information of the FMU metadata 402 for the memory unit that is determined to be fresh. If, at block 620, maintenance module 326 determines that the memory unit is stale, then at block 630, maintenance module 326 discards the examined recovery parameters. If, at block 635, maintenance module 326 determines that there is no longer any space available to store the entire memory management table 200, 408 in volatile memory 112, then maintenance module 326 writes the updated the memory management table 200, 408 to NVM 115. If, at block 635, maintenance module 326 determines that there is space available to store the entire memory management table 200, 408 in volatile memory 112, then at block 640, if maintenance module 326 determines that the recovery parameters for all memory units for all blocks of the plurality of blocks have been examined, then at block 640, maintenance module 326 writes the updated the memory management table 200, 408 to NVM 115. If, at block 640, maintenance module 326 determines that the recovery parameters of at least one memory unit of at least one block of the plurality of blocks has not yet been examined, then maintenance module 326 returns to execution of block 610. In an embodiment, the maintenance module 326 signals to the host device 104 that a recovery procedure is completed successfully.

In an embodiment, upon receiving a write request, write module 324 updates the metadata and the memory management table 200, 408 with a logical address of the memory unit. The maintenance module 326 may update the metadata of a block of NVM 115 with a program erase count (PEC).

Figure 7:
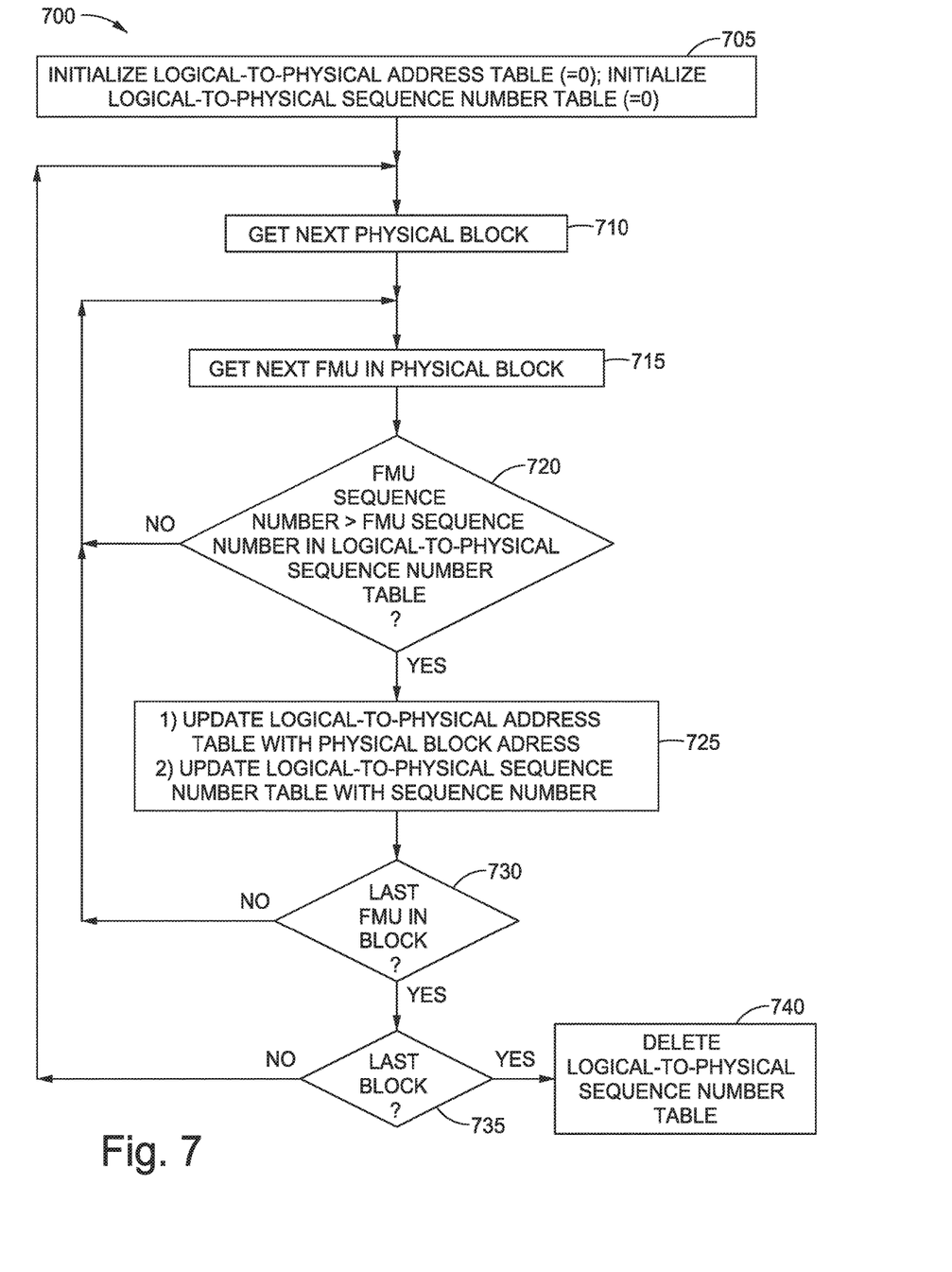
FIG. 7 is a flow diagram illustrating an example technique for determining whether a retrieved block is fresh or stale according to block 615 of FIG. 6, in accordance with one or more techniques of this disclosure.

FIG. 7 is a flow diagram 700 illustrating an example technique for determining whether a retrieved block is fresh or stale according to block 615 of FIG. 6, in accordance with one or more techniques of this disclosure. For ease of illustration, the technique of FIG. 7 will be described with concurrent reference to storage device 106 of FIGS. 1-2C. However, the techniques may be used with any combination of hardware or software.

At block 705, maintenance module 326 of controller 108 of host device 104 initializes memory management table 200 and sequence number table 210 with zero values and zero sequence number values. At block 710, maintenance module 326 reads a memory block 205 from NVM 115. At block 715, maintenance module 326 examines a next FMU from the memory block 205. At block 720, maintenance module 326 determines whether the corresponding sequence number of the FMU being examined and stored in the memory block 205 is greater than an FMU sequence number stored in the current logical-to-physical address mapping of the memory block 205 stored in memory management table 200. If, at block 720, the answer is no, then the sequence number is stale, the sequence number is discarded, and execution returns to block 715. If, at block 720, the answer is yes, then at block 725, maintenance module 326 updates memory block 205 associated with the FMU being examined and memory management table 200 with the current logical-to-physical address mapping, and updates the current sequence number for the FMU in the sequence number table 210. If, at block 730, the FMU being examined is not the last FMU in the memory block 205 being examined, then execution returns to block 715. If, at block 730, the FMU being examined is the last FMU in the memory block 205 being examined, then if, at block 735, the memory block 205 being examined is the last block to be examined, then at block 740, maintenance module 326 deletes all of the logical-to-physical sequence number pages in the sequence number table 210; otherwise, execution returns to block 710.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components nt functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

While the foregoing is directed to embodiments of the present disclosure, other and further embodiments of the disclosure may be devised without departing from the basic scope thereof, and the scope thereof is determined by the claims that follow.

What is claimed is:

1. A method for self-recovery of memory management tables for solid state storage devices, comprising:
receiving, by a controller, an indication that a memory management table loaded to a random-access storage device and associated with a non-volatile storage device is in a corrupted state;
retrieving one or more error recovery parameters of a first memory unit stored in metadata of a physical block of a plurality of physical blocks of the non-volatile storage device;
examining the one or more error recovery parameters to determine whether the one or more error recovery parameters indicate the first memory unit is fresh or stale, wherein the first memory unit is determined to be fresh if a sequence number of the error recovery parameters corresponding to the first memory unit is greater than a sequence number corresponding to a second memory unit stored in the metadata with the same logical address as the first memory unit;
updating the memory management table with logical-to-physical translation information of the metadata for the first memory unit that is determined to be fresh; and
writing the updated memory management table to the non-volatile storage device.

2. The method of claim 1, wherein said writing is in response to the one or more error recovery parameters for all memory units for all blocks of the plurality of blocks have been examined.

3. The method of claim 1, wherein said writing is in response to no more space being available in volatile memory to store the entire memory management table.

4. The method of claim 1, further comprising, upon receiving a write request, updating the metadata and the memory management table with a logical address of the first memory unit.

5. The method of claim 1, wherein the one or more error recovery parameters are the logical address of the first memory unit and a sequence number of the first memory unit.

6. The method of claim 1, further comprising updating the metadata with a program erase count (PEC).

7. The method of claim 1, wherein the one or more error recovery parameters are loaded to volatile memory.

8. The method of claim 1, wherein the indication that the memory management table is in a corrupted state further comprises receiving a command for self-recovery of memory management tables.

9. The method of claim 8, wherein the command is received during system boot-up.

10. The method of claim 8, wherein the command is received after system boot-up.

11. The method of claim 1, wherein the indication that the memory management table is in a corrupted state further comprises determining that a threshold number of attempts to boot the memory controller has failed.

12. A method for self-recovery of memory management tables for solid state storage devices, comprising:
receiving, by a controller, an indication that a memory management table loaded to a random-access storage device and associated with a non-volatile storage device is in a corrupted state;
retrieving one or more error recovery parameters of a memory unit stored in metadata of a physical block of a plurality of physical blocks of the non-volatile storage device wherein the memory unit is a first memory unit;
when the first memory unit and a second memory unit both have the same logical address and:
when a sequence number of the error recovery parameters corresponding to the first memory unit is greater than a sequence number corresponding to the second memory unit in the metadata, determining that the memory unit is fresh; and
when the sequence number of the error recovery parameters corresponding to the first memory unit is less than the sequence number corresponding to the second memory unit in the metadata, determining that the memory unit is stale;
examining the one or more error recovery parameters to determine whether the one or more error recovery parameters indicate the memory unit is fresh or stale;
updating the memory management table with logical-to-physical translation information of the metadata for the memory unit that is determined to be fresh; and
writing the updated memory management table to the non-volatile storage device.

13. The method of claim 12, wherein when the one or more error recovery parameters are determined to be stale, discarding the one or more error recovery parameters.

14. The method of claim 12, wherein when the one or more error recovery parameters are determined to be fresh, updating the metadata with one or more of the error recovery parameters.

15. The method of claim 14, further comprising signaling to a host device that a recovery procedure is completed successfully.

16. A storage device comprising:
a non-volatile storage device;
a random-access storage device; and
a controller coupled to the non-volatile storage device and the random-access storage device, the controller configured to:
receive an indication that a memory management table loaded to a random-access storage device and associated with a non-volatile storage device is in a corrupted state;
retrieve one or more error recovery parameters of a first memory unit stored in metadata of a physical block of a plurality of physical blocks of the non-volatile storage device;
examine the one or more error recovery parameters to determine whether the one or more error recovery parameters indicate the first memory unit is fresh or stale, wherein the first memory unit is determined to be fresh if a sequence number of the error recovery parameters corresponding to the first memory unit is greater than a sequence number corresponding to a second memory unit stored in the metadata with the same logical address as the first memory unit;
update the memory management table with logical-to-physical translation information of the metadata for the first memory unit that is determined to be fresh; and
write the updated memory management table to the non-volatile storage device.

17. The storage device of claim 16, wherein the non-volatile storage device is selected from the group consisting of a NAND flash memory device, a phase-change memory device (PCM), a magnetoresistive random access memory device (MRAM), and a resistive random access memory device (ReRAM).

18. A storage device comprising:
a non-volatile storage device;
a random-access storage device; and
a controller coupled to the non-volatile storage device and the random-access storage device, the controller configured to:
receive an indication that a memory management table loaded to a random-access storage device and associated with a non-volatile storage device is in a corrupted state;
retrieve one or more error recovery parameters of a memory unit stored in metadata of a physical block of a plurality of physical blocks of the non-volatile storage device;
examine the one or more error recovery parameters to determine whether the one or more error recovery parameters indicate the memory unit is fresh or stale wherein the memory unit is a first memory unit;
when the first memory unit and a second memory unit both have the same logical address and:
when a sequence number of the error recovery parameters corresponding to the first memory unit is greater than a sequence number corresponding to a second memory unit in the metadata, determine that the memory unit is fresh; and
when the sequence number of the error recovery parameters corresponding to the first memory unit is less than the sequence number corresponding to the second memory unit in the metadata; determine that the memory unit is stale;
update the memory management table with logical-to-physical translation information of the metadata for the memory unit that is determined to be fresh; and
write the updated memory management table to the non-volatile storage device.

19. A storage device comprising:
means for receiving an indication that a memory management table loaded to a random-access storage device and associated with a non-volatile storage device is in a corrupted state;
means for retrieving one or more error recovery parameters of a first memory unit stored in metadata of a physical block of a plurality of physical blocks of the non-volatile storage device;
means for examining the one or more error recovery parameters to determine whether the one or more error recovery parameters indicate the first memory unit is fresh or stale;
means for determining the first memory unit is fresh if a sequence number of the error recovery parameters corresponding to the first memory unit is greater than a sequence number corresponding to a second memory unit stored in the metadata with the same logical address as the first memory unit;
means for updating the memory management table with logical-to-physical translation information of the metadata for the first memory unit that is determined to be fresh; and
means for writing the updated memory management table to the non-volatile storage device.

20. The storage device of claim 19, further comprising means for determining that the first memory unit is stale.

21. The storage device of claim 19, further comprising means for discarding the one or more error recovery parameters.

22. The storage device of claim 19, further comprising means for updating the metadata with one or more of the error recovery parameters.

* * * * *